Nov. 17, 1942. H. M. BACON 2,302,094
MOLD FOR MOLDING PICKERS
Original Filed March 28, 1941
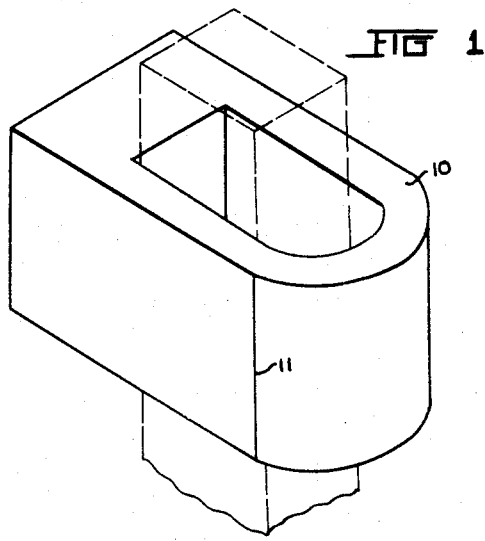
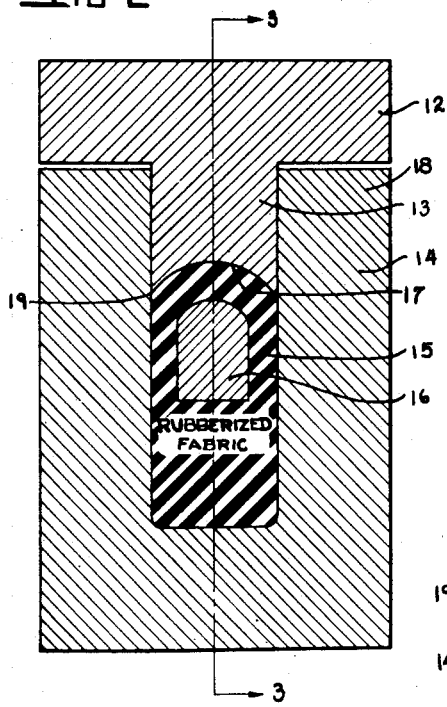
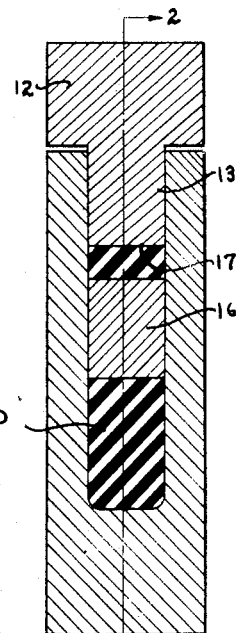
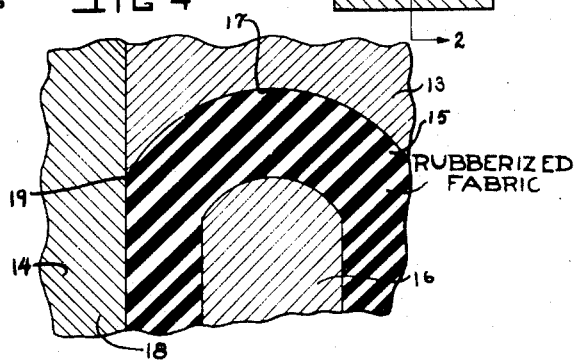
INVENTOR
HENRY M. BACON
ATTORNEYS Patented Nov. 17, 1942

2,302,094

UNITED STATES PATENT OFFICE 2,302,094

MOLD FOR MOLDING PICKERS

Henry M. Bacon, Dayton, Ohio, assignor to The Dayton Rubber Manufacturing Company, Dayton, Ohio, a corporation of Ohio Original application March 28, 1941, Serial No. 385,715. Divided and this application September 10, 1941, Serial No. 410,317

3 Claims. (Cl. 18—42)

This invention relates to molds, and more particularly to mold for molding pickers, and this application is a division of my copending application Serial No. 385,715, filed March 28, 1941.

Hitherto pickers commonly used have been characterized by surface flaws which caused certain inconveniences and brought about interference with and improper operation. It is the purpose of this invention to provide a picker wherein the outer surfaces are perfectly smooth and devoid of rough, abraded surface portions which have a tendency to catch fine threads and interfere with the proper operation of the picker, and to accomplish this end, this invention provides an improved mold eminently well adapted for molding pickers from plastic materials in a manner which obviates surface flash and the necessity for trimming the picker molded therein. The mold of my invention is further characterized by the close fit between the male and female portions of the mold whereby outflow of material between the abutting parts of the mold is prevented and a picker obtained which has smooth continuous surfaces free from pinched, crimped, or broken fabric and thereby devoid of those surface flaws which cause inconveniences with and improper operation of the picker.

The accompanying drawing is for the purpose of illustrating the general construction and use of the mold that is the subject of this invention and the nature of the molded picker produced therein.

Fig. 1 illustrates in perspective a finished molded loop picker made in the mold of my invention;

Fig. 2 is a sectional view taken through the mold of my invention and illustrating the manner of molding the loop picker;

Fig. 3 is a sectional view taken on the line 3—3 of Fig. 2 looking in the direction of the arrows; and Fig. 4 is an enlarged fragmentary section illustrating the accurate and close fit of the male and female portions of the mold of my invention.

In general, heretofore it has been the custom to mold or cure loop pickers without regard to the mold opening at the so-called part line. This has necessitated the trimming off of the overflow material along the part line and this trimming produces a rough surface on the outer side of the picker which tends to catch fine threads, especially silk and filament rayon. This results in the spoilage of material and has been the source of a great deal of trouble.

It has been proposed to overcome this difficulty by advancing the mold part line from the front of the picker towards the rear portion but this does not eliminate the necessity of trimming and abrading off the mold part line. Even when the mold is designed to form a part line along the rear portion of the picker, this has not been found satisfactory from a quality standpoint as a production method. The objection has been that in production too accurate building, cutting and curing controls are required in order to produce a picker which is free from defects. From a quality angle, if the picker is underweight the proper density and cure are not obtained and the picker may be rough, soft and have a short service life. If, however, the picker is overweight, excessive overflow along the mold part line when formed along the rear portion of the sides of the picker causes fabric plies to be pinched or cut off. This weakens the picker and when the picker is driven onto an oversized stick, the loop either breaks or opens up forming a rough spot which catches the threads or filaments necessitating discarding the picker even before it is worn out.

I have discovered, however, that if the mold is designed to totally close around the picker body and is made to fit accurately thereto with tolerances which will permit practically no overflow, the picker can be molded to a finished product wherein no trimming or skiving off of surface portions is required. In this way, a molded picker is provided wherein the external surface portions of the picker are very smooth and free from rough spots or wrinkled fabric. In this way, a greatly improved picker is produced which is free from defects and the disadvantages common to the conventional molded pickers.

Although I have illustrated my invention as particularly related to loop type pickers, it will be understood that my invention is not limited to loop pickers but may be utilized in producing any type of picker or related loom machine elements which are molded.

Referring to the drawing, the loop picker, such as indicated at 10, is formed having molded rounded edges and wherein the mold part line 11 formed at opposite sides along the rear portion of the picker is smooth and free from fringe or overflow when taken from the mold. The external surfaces of the picker all retain the finish of the mold and form a continuous smooth surface.

As illustrated in Figures 2 and 3, my improved mold comprises a T-shaped mold half 12 having a depending portion 13 slidably engageable in the mold half 14. In molding the loop picker, as shown, the built-up picker body 15 is placed in the U-shaped mold half 14 with the core member 16 inserted in the opening or loop portion of the picker and the mold parts assembled, as illustrated in Figure 2. The depending portion 13 comprises a concave spherical surface portion 17 which engages the rear portion of the picker and is accurately fitted to the sides 18 of the U-shaped mold half 14. The mold parts are so designed that they fit together in such a manner that there is substantially no opening between the mold halves. The mold part line 19 is thereby substantially eliminated with its attendant trimming requirement.

The loop picker may be made of any suitable material, for example, rubber, synthetic resin, rubberized fabric or other resilient vulcanizable and moldable material. The particular material for forming the pickers forms no part of this invention and the same may be made from material such as disclosed in my prior Patent No. 2,149,568.

It will be understood that while I have described and illustrated one embodiment of my invention, it is not my intention to have my invention limited to or circumscribed by the specific details of arrangement and construction herein described and illustrated, since it is possible to provide other embodiments of my invention within the spirit and scope of the appended claims.

I claim:

1. In a mold adapted to form plastic materials, in combination: a U-shaped female portion having substantially flat bottom and side walls; a T-shaped male portion adapted closely to fit within said female portion, said male portion having substantially flat side walls and an arcuate base; and an insert member having flat sides and base, and an arcuate top corresponding to the curvature of the base of said male portion and transversely disposed centrally within said female portion and in intimate contact therewith on two sides thereof but spaced from said male and female portions at the other two sides, top and bottom.

2. In a mold adapted to form plastic materials, in combination: a U-shaped female portion having substantially flat bottom and side walls; a T-shaped male portion adapted closely to fit within said female portion, said male portion having substantially flat side walls and an arcuate base; and an insert member transversely disposed centrally within said female portion and in intimate contact therewith on two sides thereof only, said insert being out of contact with said male portion and nearer the base of the T than the base of the U.

3. A mold according to claim 2 in which the arcuate base is adapted closely to fit against the side walls of the female portion, whereby molded articles free from surface flash are produced therewith.

HENRY M. BACON.